(12) United States Patent
Crawford et al.

(10) Patent No.: US 9,767,943 B2
(45) Date of Patent: Sep. 19, 2017

(54) PATTERNED NANOPARTICLE ASSEMBLY METHODOLOGY

(71) Applicants: Thomas M. Crawford, Irmo, SC (US); Longfei Ye, Columbia, SC (US); Tanner G. Pearson, Lyman, SC (US); O. Thompson Mefford, Clemson, SC (US); Yves Cordeau, Pauline, SC (US)

(72) Inventors: Thomas M. Crawford, Irmo, SC (US); Longfei Ye, Columbia, SC (US); Tanner G. Pearson, Lyman, SC (US); O. Thompson Mefford, Clemson, SC (US); Yves Cordeau, Pauline, SC (US)

(73) Assignees: University of South Carolina, Columbia, SC (US); Clemson University, Clemson, SC (US)

( * ) Notice: Subject to any disclaimer, the term of this patent is extended or adjusted under 35 U.S.C. 154(b) by 41 days.

(21) Appl. No.: 14/535,996

(22) Filed: Nov. 7, 2014

(65) Prior Publication Data

US 2015/0125623 A1    May 7, 2015

Related U.S. Application Data

(60) Provisional application No. 61/962,469, filed on Nov. 7, 2013.

(51) Int. Cl.
    *G11B 5/845*    (2006.01)
    *H01F 1/00*    (2006.01)
(52) U.S. Cl.
    CPC ............ *H01F 1/009* (2013.01); *G11B 5/845* (2013.01); *H01F 1/0054* (2013.01)

(58) Field of Classification Search
    None
    See application file for complete search history.

(56) References Cited

U.S. PATENT DOCUMENTS

| 3,826,667 | A |   | 7/1974 | Cohen |
| 3,855,526 | A |   | 12/1974 | Molina |
| 4,529,621 | A |   | 7/1985 | Ballard |
| 4,604,222 | A | * | 8/1986 | Borduz ................. H01F 1/44  252/62.51 R |
| 4,935,147 | A |   | 6/1990 | Ullman et al. |
| 4,976,883 | A | * | 12/1990 | Kanno ................. H01F 1/44  252/62.52 |

(Continued)

FOREIGN PATENT DOCUMENTS

WO    WO2008/118191    11/2008

OTHER PUBLICATIONS

S. Singamaneni, V. N. Bliznyuk, C. Binek, and E. Y. Tsymbal, "Magnetic nanoparticles: recent advances in synthesis, self-assembly and applications," *J. Mater. Chem.*, (2011) 21, 16819-16845 (28 pages).

(Continued)

*Primary Examiner* — Erma Cameron
(74) *Attorney, Agent, or Firm* — Dority & Manning, P.A.

(57) ABSTRACT

Methods for forming a nanoparticle assembly are generally provided. The method can comprise applying a colloidal fluid to a surface of a magnetic media, wherein the colloidal fluid comprises magnetic nanoparticles, a surfactant, a trigger salt, and a carrier medium; and assembling the magnetic nanoparticles into a pattern through a magnetic force arising from the surface of the magnetic media.

21 Claims, 10 Drawing Sheets

(56) References Cited

U.S. PATENT DOCUMENTS

| | | | |
|---|---|---|---|
| 4,978,938 A | | 12/1990 | Partin et al. |
| 5,147,573 A | * | 9/1992 | Chagnon .................. H01F 1/44 252/519.21 |
| 5,325,566 A | | 7/1994 | Jahani |
| 5,445,008 A | | 8/1995 | Wachter et al. |
| 5,676,877 A | | 10/1997 | Borduz et al. |
| 5,769,996 A | * | 6/1998 | McArdle .................. H01F 1/44 156/272.4 |
| 5,792,510 A | | 8/1998 | Farrow et al. |
| 6,262,306 B1 | | 7/2001 | Leriche et al. |
| 6,821,596 B2 | | 11/2004 | Terao et al. |
| 7,031,186 B2 | | 4/2006 | Kang et al. |
| 8,617,643 B2 | | 12/2013 | Crawford |
| 2002/0081714 A1 | | 6/2002 | Jain et al. |
| 2004/0257894 A1 | | 12/2004 | Onogi et al. |
| 2005/0087000 A1 | | 4/2005 | Coehoorn et al. |
| 2005/0145909 A1 | | 7/2005 | Giebeler et al. |
| 2005/0147977 A1 | | 7/2005 | Koo et al. |
| 2005/0238967 A1 | | 10/2005 | Rogers et al. |
| 2005/0239948 A1 | | 10/2005 | Haik et al. |
| 2005/0249667 A1 | | 11/2005 | Tuszynski et al. |
| 2006/0003152 A1 | | 1/2006 | Youngs |
| 2007/0202403 A1 | | 8/2007 | Oh et al. |
| 2007/0237987 A1 | | 10/2007 | Winarski |
| 2008/0003159 A1 | * | 1/2008 | Cheon .................. B82Y 25/00 423/263 |
| 2008/0176109 A1 | | 7/2008 | Kim et al. |
| 2012/0094017 A1 | * | 4/2012 | Crawford .............. B82Y 30/00 427/130 |

OTHER PUBLICATIONS

M. Grzelczak, J. Vermant, E. M. Furst, and L. M. Liz-Marzan, "Directed self-assembly of nanoparticles," *ACS Nano*, (2010) 4, 3591-3605 (16 pages).

J. Henderson, S. Shi, S. Cakmaktepe, and T. M. Crawford, "Pattern transfer nanomanufacturing using magnetic recording for programmed nanoparticle assembly," *Nanotechnology*, 23 (2012) (14 pages).

L. Ye, B. Terry, O. T. Mefford, C. Rinaldi, and T. M. Crawford, "All-nanoparticle concave diffraction grating fabricated by self-assembly onto magnetically-recorded templates," *Opt. Express*, 21, 1066-1075 (2013) (10 pages).

E. Hecht, "Optics," (Addison-Wesley, 2001) Chap. 10, 4th ed. (2 pages).

B. Qi, L. Ye, R. Stone, C. Dennis, T. M. Crawford, and O. T. Mefford, "Influence of ligand-precursor molar ratio on the size evolution of modifiable iron oxide nanoparticles," The Journal of Physical Chemistry C, 117, 5429{5435 (2013) (37 pages).

M. Kerker, *The Scattering of Light and Other Electromagnetic Radiation*, 1st ed. (Academic, New York, 1969).

Gokemeijer, et al., Recording head metrology at sub-100 nm device dimensions. Journal of *Applied Physics*, 2005. 97: p. 083912.

Gokemeijer, et al., Direct measurement of the field from a magnetic recording head using an InAs hall sensor on a contact write/read tester. Journal of Magnetism and Magnetic Materials, 2005. 290-291: p. 254.

Gokemeijer, et al., Write field measurements of a perpendicular head on a soft underlayer film. IEEE Transactions on Magnetics, 2006. 42: p. 163.

Leonhardt, et al., Comparison of perpendicular and longitudinal magnetic recording using a contact write/read tester. IEEE Trans. Magn., 2001. 37(4): p. 1580.

Lohau, et al., Dynamic coercivity measurements of antiferromagnetically coupled magnetic media layers. Appl. Phys. Lett., 2001. 78(18): p. 2748.

Moser, et al., Dynamic coercivity measurements in thin film recording media using a contact write/read tester. J. Appl. Phys., 1999. 85(8): p. 5018.

Schrag, et al., Submicron electrical current density imaging of embedded microstructures. Appl. Phys. Lett., 2003. 82(19): p. 3272.

Yamamoto et al., Scanning magnetoresistance microscopy (SMRM): Imaging with a MR head. J. Appl. Phys., 1997. 81(8): p. 4696.

Shi et al., "A General Approach to Binary and Ternary Hybrid Nanocrystals" Nano Letters 2006, vol. 6, No. 4, 875-881.

Zhu et al., "Well-Aligned Open-Ended Carbon Nanotube Architectures: An Approach for Device Assembly" (Jan. 4, 2006) vol. 6, No. 2, 243-247.

Terris et al., "Nanofabricated and Self-Assembled Magnetic Structures as Data Storage Media" J. Phys. D: Appl. Phys. 38 (2005) R199-R222.

Univ. of South Carolina; International Search Report for PCT/US07/80080, Sep. 22, 2008; (2 pgs.).

Univ. of South Carolina; International Search Report for PCT/US07/81070, Oct. 3, 2008; (2 pgs.).

\* cited by examiner

PATTERNED NANOPARTICLE ASSEMBLY METHODOLOGY

PRIORITY INFORMATION

The present application claims priority to U.S. Provisional Patent Application Ser. No. 61/962,469 titled "Patterned Nanoparticle Assembly Methodology" of Crawford, et al. filed on Nov. 7, 2013, the disclosure of which is incorporated by reference herein.

GOVERNMENT SUPPORT CLAUSE

This invention was made with government support under contract nos. 1130636 and CMMI-1130819 awarded by National Science Foundation. The government has certain rights in the invention.

BACKGROUND

As described in U.S. Publication No. 2010/0279024 entitled: "Reprogrammable Parallel Nanomanufacturing" of Thomas Crawford, which is incorporated by reference herein, magnetic recording can be employed to generate nanoscale magnetic field patterns on the surface of magnetic media. By exposing the surface containing these nanoscale patterns to a colloidal fluid containing magnetic nanoparticles (ferrofluid), nanoscale patterns with macroscopic dimensions can be created which are both programmable and re-programmable.

However, in order to keep ferrofluids well-dispersed in the fluid such that the nanoparticles do not clump together, when synthesized, the nanoparticles are coated with a chemical surfactant (for example, citrate). The actual process by which the particles do not aggregate involves a finite electrostatic charge on the surfactant molecules themselves. Since all of the magnetic nanoparticles have this surfactant coating on their surface, either electrically positive or negative, the net effect is that if the particles approach one another, a repulsive electrostatic force keeps them from aggregating into larger assemblies.

The negatively charged nanoparticle surfactant exerts a force that tries to push the nanoparticles away from each other, while the magnetic force tries to pull them toward the surface. Once assembled, this Coulomb repulsive force opposes the magnetic force pulling the particles to the surface and to each other. While nanoparticles can be assembled in fluid into patterns based on the underlying magnetic field nanostructure, the Coulomb repulsion, together with strong currents within the suspension fluid and the fluid surface tension as it dries, can be sufficient to overcome the magnetic force holding the particles to the surface and pull the assembled particles away from the surface of the media, such that when the fluid is removed, so is the pattern.

As such, a need exists for improved methods of forming a nanoparticle assembly on a magnetic media.

SUMMARY

Objects and advantages of the invention will be set forth in part in the following description, or may be obvious from the description, or may be learned through practice of the invention.

Methods are generally provided for forming a nanoparticle assembly. In one embodiment, the method comprising applying a colloidal fluid to a surface of a magnetic media, wherein the colloidal fluid comprises magnetic nanoparticles, a surfactant, a trigger salt, and a carrier medium; and assembling the magnetic nanoparticles into a pattern through a magnetic force arising from the surface of the magnetic media.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally disclosed for creating a precision assembly of nanoparticles by controlled deposition from a colloidal fluid (e.g., a ferrofluid). By adding a trigger (e.g., a weak salt solution) to a colloidal nanoparticle suspension, the self-assembly of the nanoparticles is enhanced in the presence of large field gradients that attract the suspension particles into a patterned arrangement. In this specific approach, a dilute colloidal fluid (e.g., a colloidal suspension of magnetic nanoparticles, such as magnetite or $Fe_3O_4$) is employed. This colloid is introduced above a magnetic field template that is magnetically recorded in magnetic recording media. The magnetic field gradients present at the medium surface magnetize and then attract the magnetite nanoparticles in the colloid to build a pattern on the surface. For example, the pattern may be a diffraction grating, of which the diffraction can be monitored in real-time using a metrology.

As stated, the trigger can be a salt or a salt solution. In one embodiment, the trigger solution can include, for example, a positive ion-containing salt(s), which may help to pacify a negative charge on the magnetic nanoparticles such that a repulsive electrostatic force is reduced compared with the magnetic force. Specifically, the trigger solution can include a salt to neutralize the surfactant during magnetic assembly, including but not limited to phosphate salts (e.g., a phosphate buffered saline ("PBS"), sodium phosphate, potassium phosphate, etc.), sodium salts (e.g., NaCl, etc.), potassium salts (e.g., KCl, etc.), ammonium salts (e.g., $NH_4Cl$), or mixtures thereof.

It has been successfully demonstrated that the self-assembly/nanomanufacturing process is enhanced by adding a "trigger" solution to the colloidal fluid (i.e., the magnetic nanoparticle suspension). If provided as a trigger solution (e.g., containing the trigger salt(s) in a solvent (e.g., deionized water), the trigger solution can have a pH of about 7 to about 8, such as 7.0 to about 7.5, such as about 7.2. In one particular embodiment, a relatively small amount of a trigger salt can be added as the trigger solution. For instance, the trigger salt (e.g., a phosphate buffer, NaCl, etc.) can be added in an amount of about 10 μL to about 150 μL per 2 mL of the colloidal fluid. In certain embodiments, the trigger salt can be present in the colloidal fluid in an amount of about 0.5% to about 10% by volume, such as about 2% to about 8% by volume.

Referring to FIGS. 4A-4D, for example, it is demonstrated that a very small amount of pH 7.2 phosphate buffer (about 85 μL in this example—although this amount can be varied) when added to a magnetite colloid strongly enhances the intensity of optical diffraction obtained at a given time after introducing the suspension above the magnetic field template.

Without wishing to be bound by any particular theory, it is presently believed that the addition of a weak salt solution to the ferrofluid modifies the colloid's stability only slightly, such that the suspended particles begin to aggregate only in the presence of an external force that drives the particles together. This slight destabilization helps create a self-assembled material more quickly and with better fidelity than if no salt solution is present in the ferrofluid.

In FIGS. 4A-4D, all four graphs show a strongly peaked curve ("DIFF MAX TIME"). The DIFF MAX TIME curve (shown with black dots) is the diffraction intensity at 15 minutes of coating time as a function of how much phosphate buffer is added to the solution. Note the function is strongly peaked and has a maximum in this case at 85 μL added to a 2 mL base suspension. This base suspension is created by diluting 20 μL of a particular nanoparticle suspension in 40 mL of pH 7 solution of water with enough NaOH to make the pH meter read 7. The "DLS" curves (shown with black squares) are hydrodynamic diameter measured via Dynamic Light Scattering (DLS) with 4 different methods for extracting diameter. In all cases, the peak in the diffraction signal occurs before any change in the colloid can be detected with DLS. Thus the colloid is still stable at the level of a standard instrument's ability to notice a change, and yet the diffraction enhancement is dramatic.

Thus, self-assembly is enhanced in the presence of strong magnetic field gradients by adding very small amounts of buffer that are too small to effect any change in the bulk suspension stability/properties. In one embodiment, the present disclosure is directed to a method to aggregate colloids deliberately in the presence of strong gradient fields without having runaway aggregation in the colloid itself. Once the colloid begins to aggregate (beyond 200 μL PBS in the attached figures), the enhancement goes to zero and no coating occurs at all.

In one embodiment, the trigger solution can be added in the methods described in U.S. patent application Ser. No. 13/276,774 titled "Patterned Nanoparticle Assembly Methodology" of Crawford, et al. filed on Oct. 19, 2011 (U.S. Publication No. 2012/0094017), and/or in the methods described in U.S. Patent Application Ser. No. 61/878,844 titled "3-Dimensional Pattern Transfer Nanomanufacturing" of Crawford, et al. filed on Sep. 17, 2013), and/or in the methods described in U.S. patent application Ser. No. 12/376,646 titled "Reprogrammable Parallel Nanomanufacturing" of Crawford filed on Oct. 1, 2007 (U.S. Publication No. 2010/0279024); the disclosures of which are incorporated by reference herein.

For example, in one embodiment, the method can generally include assembling magnetic nanoparticles, fixing the nanoparticles in place, and then (optionally) allowing the completed nanoparticle assembly to be washed and dried to remove unwanted process contaminants left in the assembly fluid while preserving the underlying nanoparticle assembly as designed.

In particular, the presently disclosed methods can allow for a reliable coating of nanoparticles to be obtained after the excess colloidal fluid (e.g., ferrofluid) is removed from the surface of the magnetic media (e.g., disk). In this approach to assembly, the magnetic nanoparticles can be assembled into patterns by the magnetic force arising from a strong magnetic field gradient at the media surface which is caused by the spatial localization from which the fields are emitted.

In one embodiment, a colloidal fluid that includes magnetic nanoparticles (e.g., iron-containing particles), a surfactant (e.g., oleic acid, tetramethylammonium hydroxide, citric acid, soy lecithin, or a mixture thereof), the trigger solution described above, and a carrier medium can be applied to a surface of a magnetic media and allowed to assemble into a pattern through a magnetic force arising from the surface of the magnetic media. Thereafter, a buffer solution can optionally be added to the surface of the magnetic media to pacify the charge of the surfactant in order to allow for agglomeration of the magnetic nanoparticles in the desired pattern on the magnetic media. Optionally, a soap solution can be added to the surface of the magnetic media after adding the buffer solution in order to wash away clumped nanoparticles, buffer salts, and contaminants without disturbing the magnetic nanoparticles which are magnetically assembled.

Figure 1:
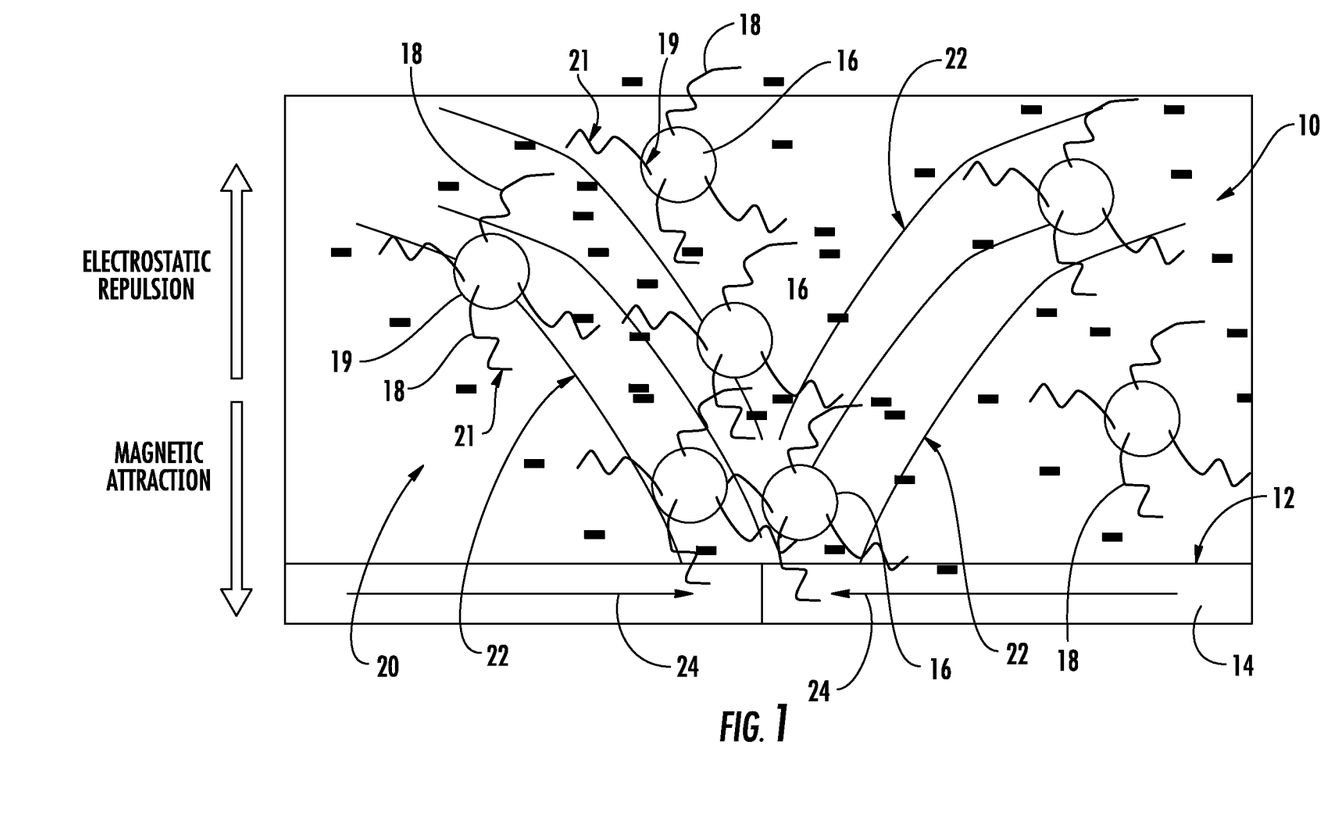
FIG. 1 shows a plurality of magnetic nanoparticles attracted to the surface by a magnetic force while the surfactant charge inhibits nanoparticle aggregation.
Figure 2:
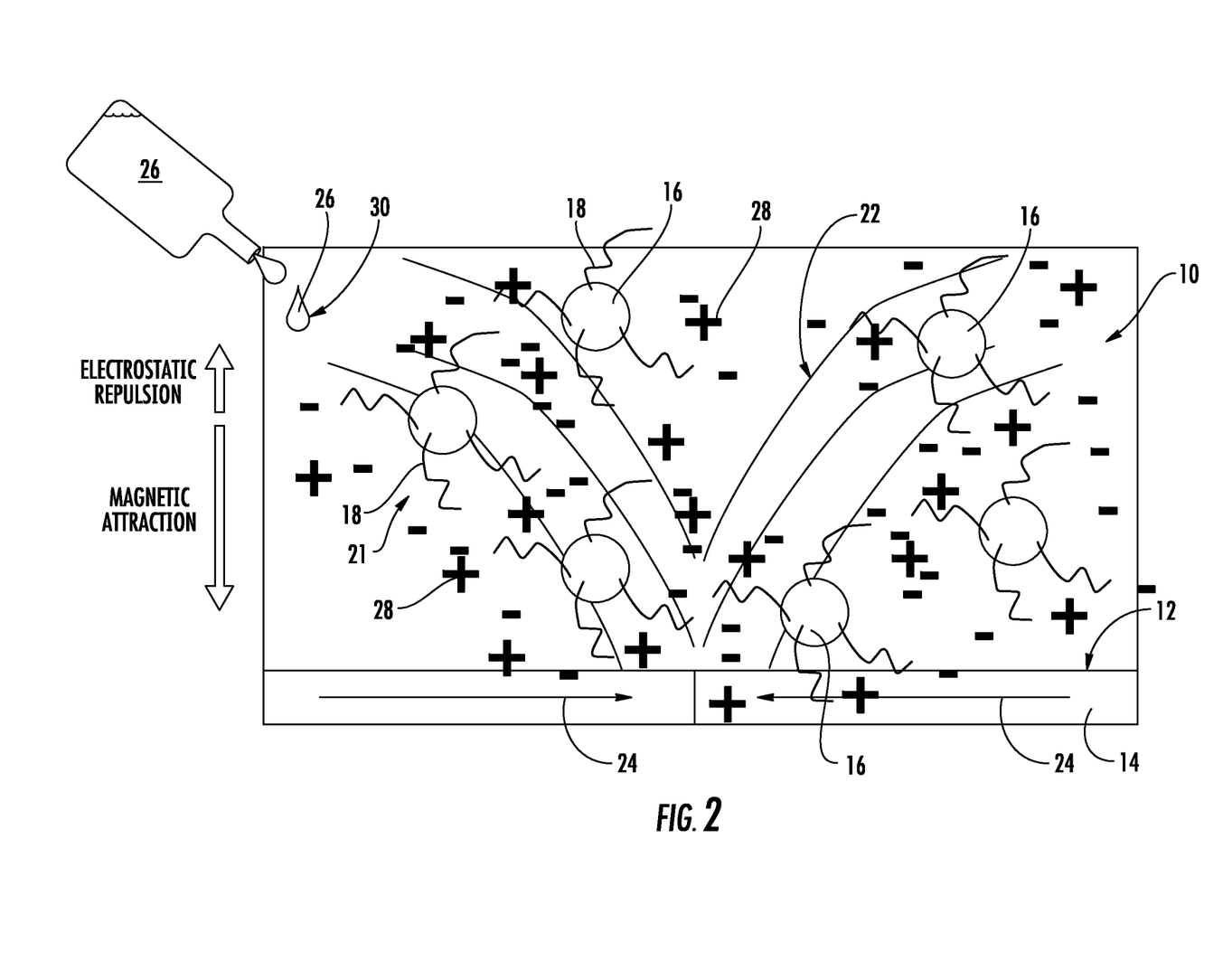
FIG. 2 shows an optional step of pacification of the surfactant charge with a buffer solution.
Figure 3:
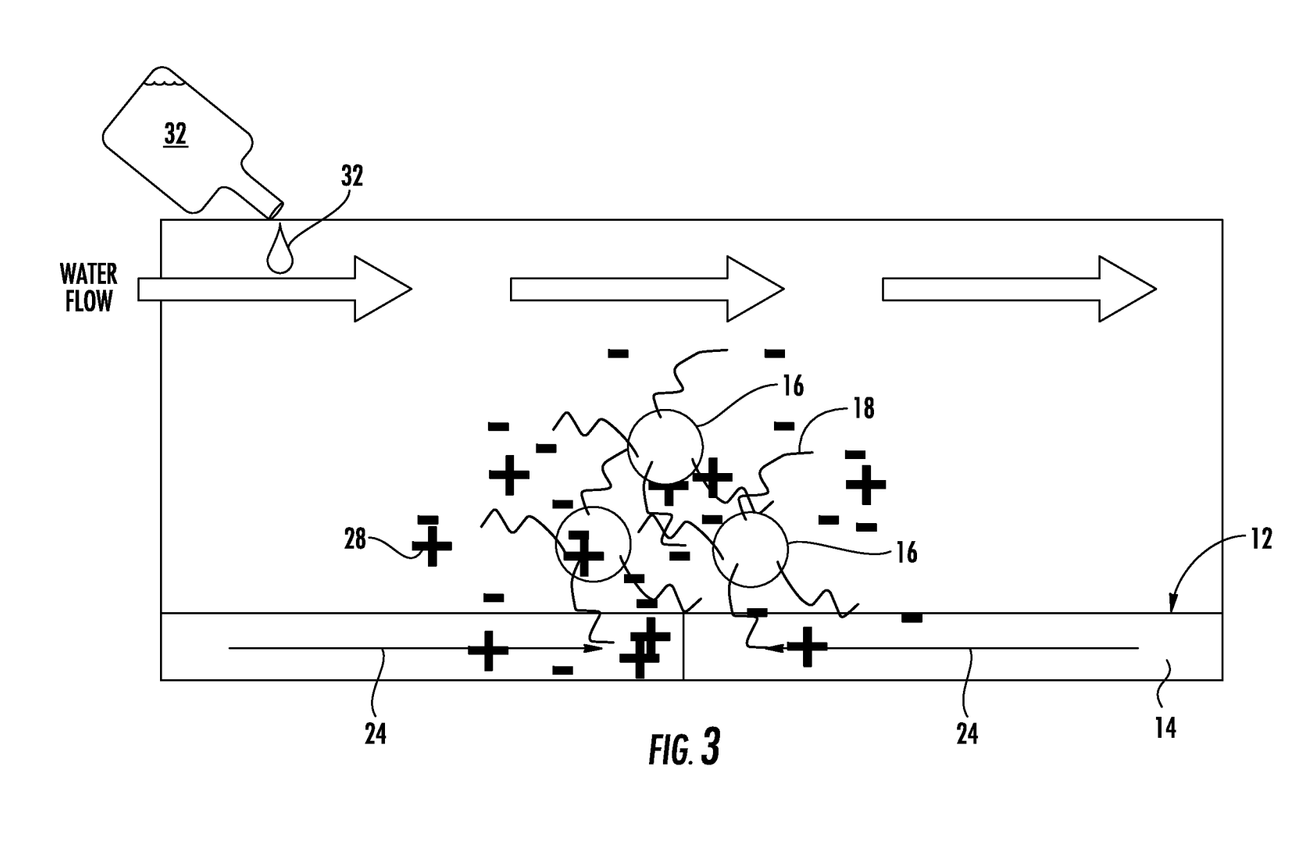
FIG. 3 shows an optional step of applying a soap solution and deionized water to wash away clumped nanoparticles, buffer salts, and contaminants without disturbing the magnetic nanoparticles which are magnetically assembled.
Figure 4A:
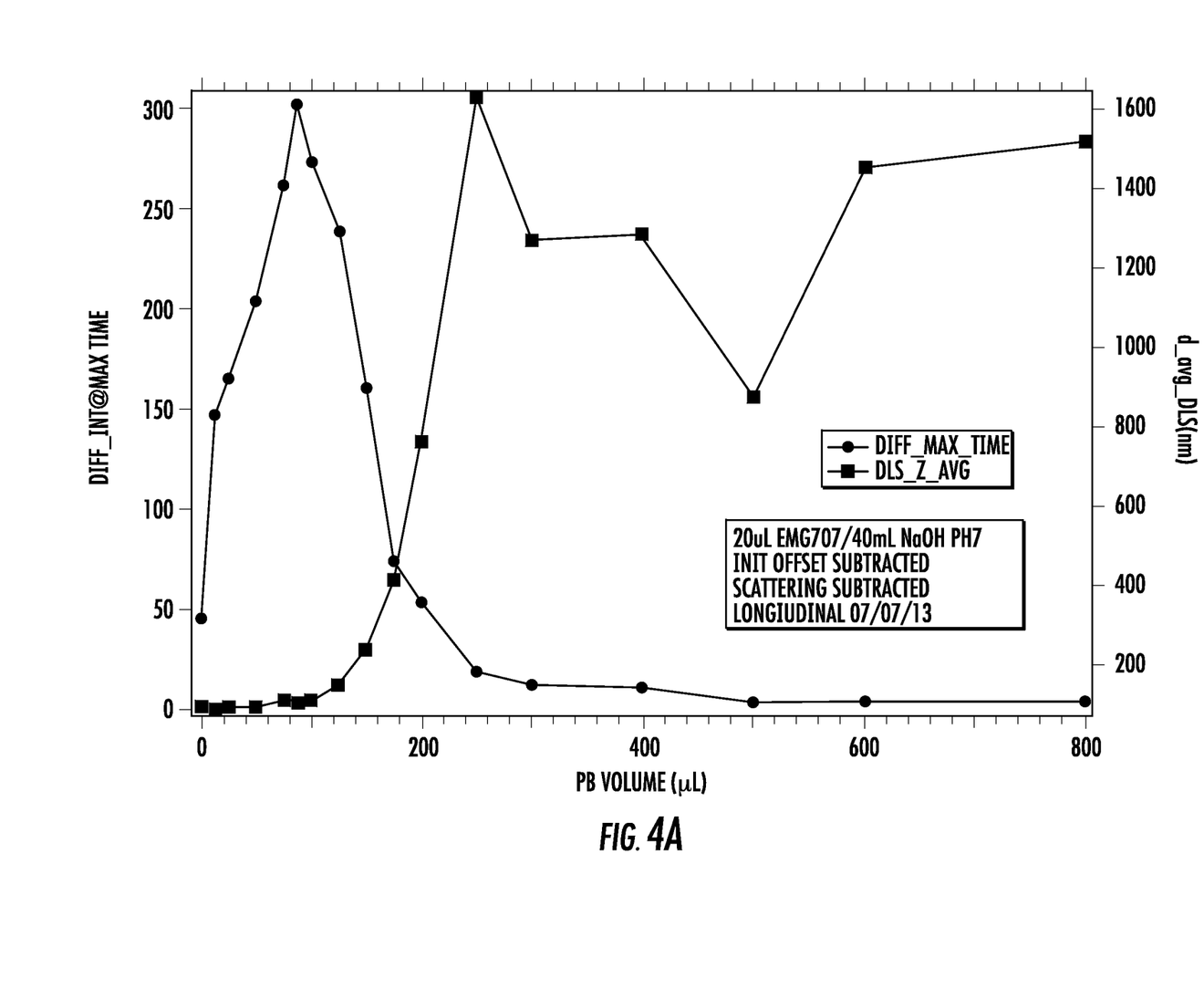
FIGS. 4A-4D show charts of results according to examples discussed below.
Figure 4B:
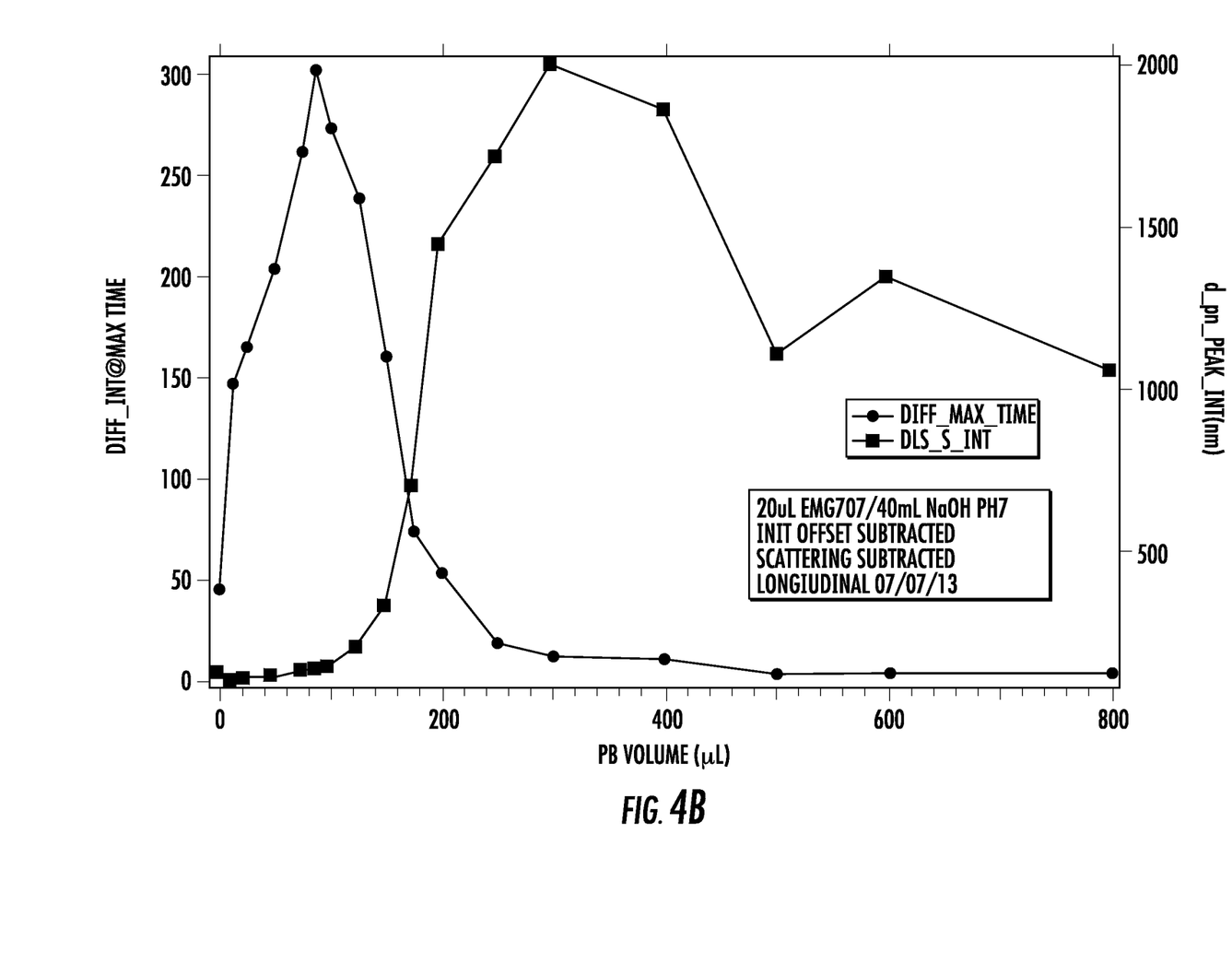
Figure 4C:
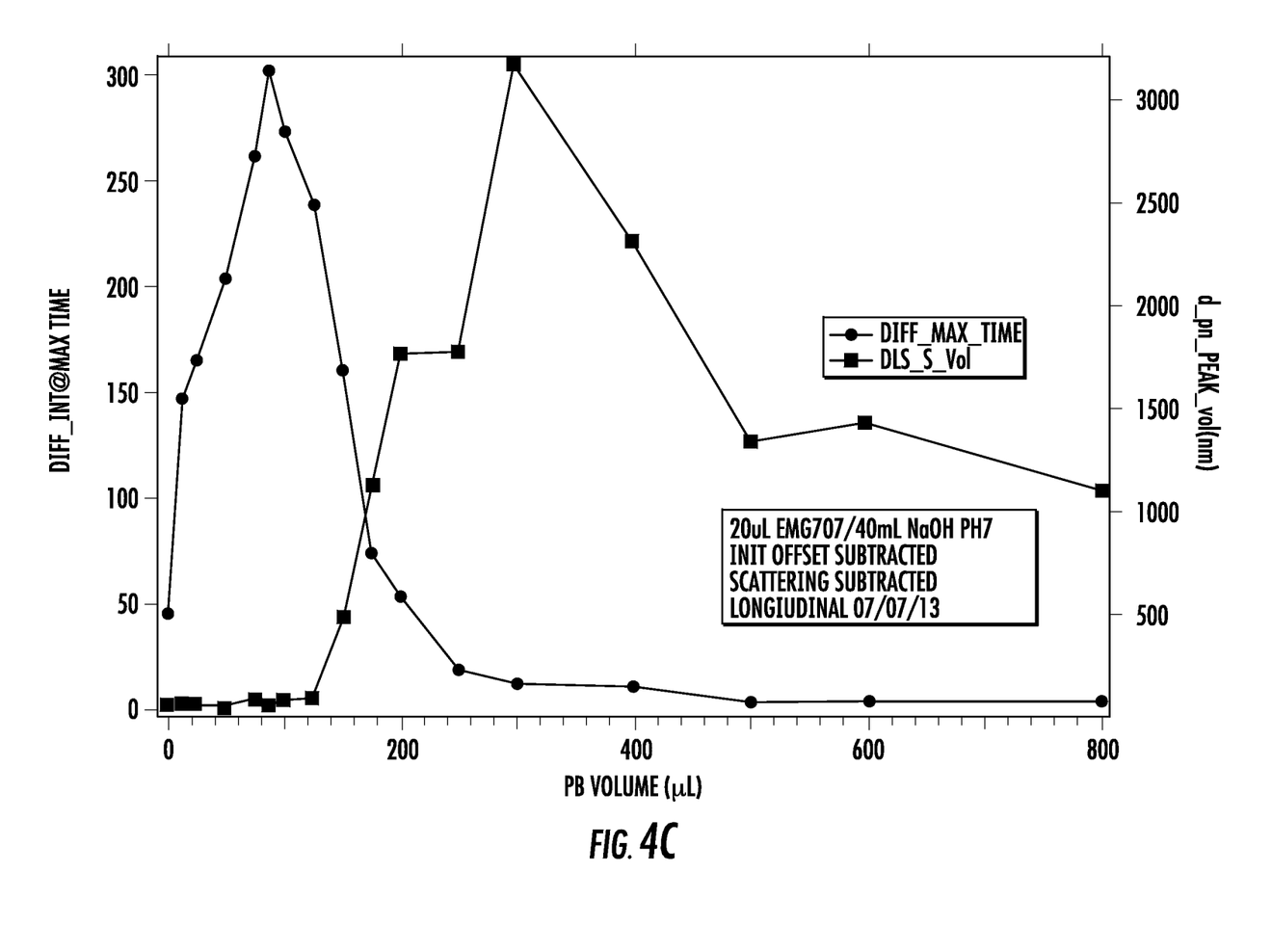
Figure 4D:
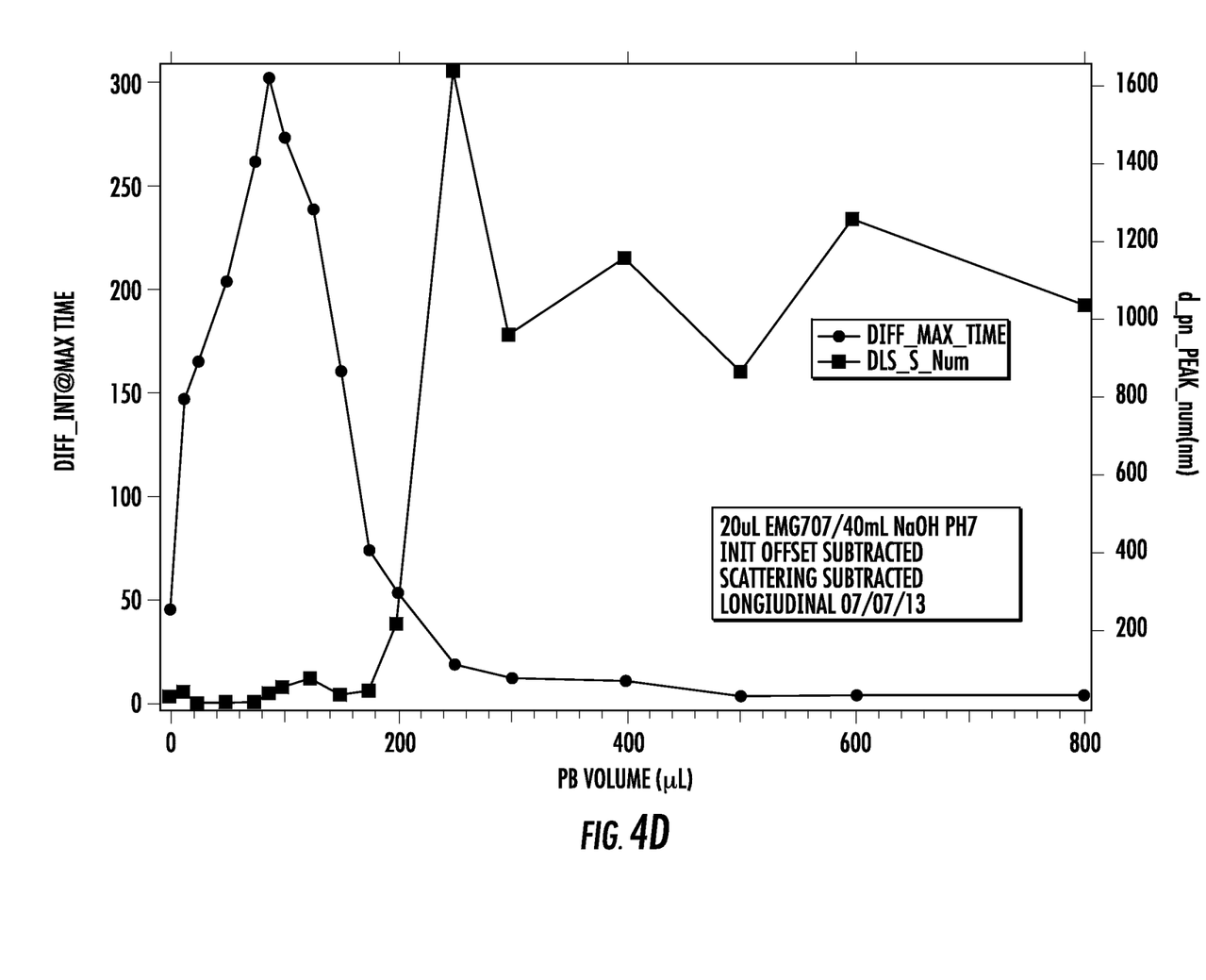

FIGS. 1-3 sequentially show one particular embodiment of such an exemplary method. As shown in FIG. 1, the colloidal fluid 10 is applied to a surface 12 of a magnetic media 14. The colloidal fluid 10 generally includes magnetic nanoparticles 16 and a surfactant 18 dispersed within a carrier medium 20 with a small amount of the trigger solution present (e.g., too minute of an amount to show). The magnetic nanoparticles 16 can be any suitable nanoparticles that magnetically interact with the magnetic media 14. For example, the magnetic nanoparticles 16 can be iron-containing particles (i.e., comprising iron), such as magnetite, hematite, another iron-containing compound, or mixtures thereof. The magnetic nanoparticles 16 can have an average size of about 100 nanometers or less (e.g., about 5 nanometers to about 25 nanometers).

The surfactant 18 can, in one embodiment, interact with the magnetic nanoparticles 16 such that the nanoparticles 16 are coated with the surfactant 18. For example, the surfactant 18 can generally define a polar head and non-polar tail. In one particular embodiment, one of the polar head or non-polar tail is adsorbed into the magnetic nanoparticle 16 while the other extends into the carrier medium 20 to form an inverse or regular micelle around the nanoparticle 16 such that steric repulsion prevents agglomeration of the magnetic nanoparticles 16. As shown, the nonpolar head 19 of the surfactant 18 is absorbed into the magnetic nanoparticles 16, while the polar tail 21 extends into the carrier medium 20.

In particular embodiments, the surfactant 18 can be oleic acid, tetramethylammonium hydroxide, citric acid, soy lecithin, or a mixture thereof.

As shown in FIG. 1, the magnetic nanoparticles 10 can assemble into a pattern through a magnetic force (lines 22) arising from the surface 12 of the magnetic media 14 after the colloidal fluid 10 is applied thereon, whereby the nanoparticles 16 are attracted along the magnetic field lines 22 to a transition in the underlying magnetic media 14. For example, the magnetic transition (shown as arrows 24 in magnetic media 14) creates a spatially varying magnetic field, and enhances a magnetic force (lines 22) in the colloidal fluid 10. Negatively charged magnetic nanoparticles 16 are attracted to the transition, but are still feeling a repulsive force (see opposing force vectors at left) due to the surfactant charge attached to the nanoparticles 16.

Specifically, the magnetic force lines from the magnetic media 14 attracts the magnetic nanoparticles 16 to the media's surface 12. However, the surfactant charge on the magnetic nanoparticles 16, which is designed to prevent aggregation thereof, opposes the magnetic force that is pulling the nanoparticles 16 together in the pattern. The particular pattern can be varied as desired through adjusting the magnetic media 14.

After the colloidal fluid 10 is applied onto the surface and the magnetic nanoparticles are assembled into the desired pattern, a buffer solution 26 can optionally be added to the colloidal fluid 10 on the surface 12 of the magnetic media 14 as shown in FIG. 2. The buffer solution 26 can generally remove contaminants left in the assembly fluid while preserving the underlying nanoparticle assembly. Generally, the buffer solution 26 can serve to pacify a charge on the magnetic nanoparticles 16 such that the repulsive electrostatic force between adjacent magnetic nanoparticles 16 is reduced without affecting the magnetic force between the nanoparticles 16 and the magnetic media 14.

In one particular embodiment, the buffer solution 26 can be a salt solution (e.g., a phosphate buffer). The buffer solution 26 can include, for example, a positive ion-containing salts 28, which can pacify a negative charge on the magnetic nanoparticles 16 such that a repulsive electrostatic force is reduced compared with the magnetic force 22. Specifically, the buffer solution 26 including a salt 28 can neutralize the surfactant charge after magnetic assembly but before the colloidal fluid 10 is removed from the surface 14.

By adding a few drops 30 of the buffer solution 26 to the colloidal fluid 10 at some point after the colloidal fluid 10 has been applied to the surface 12 and the nanoparticles 16 have had a chance to assemble on the surface 16, disruption and removal of the nanoparticles 16 as the colloidal fluid 10 is removed/dried can be avoided to yield a layer of assembled nanoparticles 16 on the surface 12.

Additional steps may also be included in the methods, as desired. For example, a soap solution 32 can be added to the colloidal fluid 10 on the surface of the magnetic media 12 after adding the buffer solution 26 as shown in FIG. 3. Because the passivation of surfactant charges occurs throughout the fluid 10 and not just at the media surface 12, the addition of the buffer solution 26 may not sufficiently yield a clean nanoparticle patterned surface 12. To prevent particle clumping from forming large aggregates which can dirty and mar the nanoparticle pattern on the surface 12, an additional surfactant can be added in the form of a soap solution 32, as shown schematically in FIG. 3. The soap solution 32 can rinse or otherwise wash away any clumped nanoparticles, buffer salts, and/or contaminants on the surface without substantially disturbing the magnetic nanoparticles which are magnetically assembled. Additionally, the surface 12 of the magnetic media 14 can be washed with deionized water after adding the soap solution 32. Thus, a clean surface 12 having the pattern of magnetic nanoparticles 16 thereon can be left.

The surfactant of the soap solution 32 can recoat unattached nanoparticles 16 still in fluid 10 that have clumped together. These recoated particles therefore do not substantially attach to the surface 12 of the magnetic media 14 and are easily washed away (e.g., with fresh deionized water).

The ability to wash and then allow the surface 12 to dry without damaging the assembled nanoparticle pattern is critical to obtaining large area nanomanufactured assemblies with nanometer precision tolerances. Here, as the assembled nanoparticles 16 are strongly bound to the surface 12 by the magnetic force and do not wash away, the surface pattern can be preserved with the deionized water wash that can flush the media surface and remove any remaining soap or buffer material. Thus the media dries cleanly without forming salt crystals or retaining debris. Thus, the presently disclosed methods can yield well defined features of assembled magnetic nanoparticles that remain after drying while preventing undesired material from remaining on the media surface.

Alternative particle, salt and surfactant combinations may be used in accordance with the presently disclosed methods, assuming that they undergo the process described above. Namely, the particles do not substantially bind together under their own electrostatic or magnetic attractions yet can be set to do so with the addition of neutralizing ions, and the effects of the ionizing salt (particle clumping, precipitation, adhesion) can be overcome by surrounding the particles with additional surfactant prohibiting further contributions to the established assemblage thus leaving it clean and intact.

Applications of these methods are particularly relevant in the nanomanufacture of transparent assemblies containing patterned nanostructures. Examples can include structures such as a nanoassembled diffraction grating, a plasmonic optical antenna or concentrator for solar energy applications, i.e. photovoltaics or artificial photosynthesis. If the nanoparticles are coated with biomaterials such as DNA, peptides, or proteins, these structures could act as cell sorters or optically readable biosensor technologies. Such assemblies could represent a secret bar code technology for sensitive items that need to be tracked without someone knowing they are being tracked. So multiple military, commercial, defense, and energy applications exist for the presently disclosed methods to manufacturing assemblies of patterned nanostructures.

EXAMPLES

Figure 5:
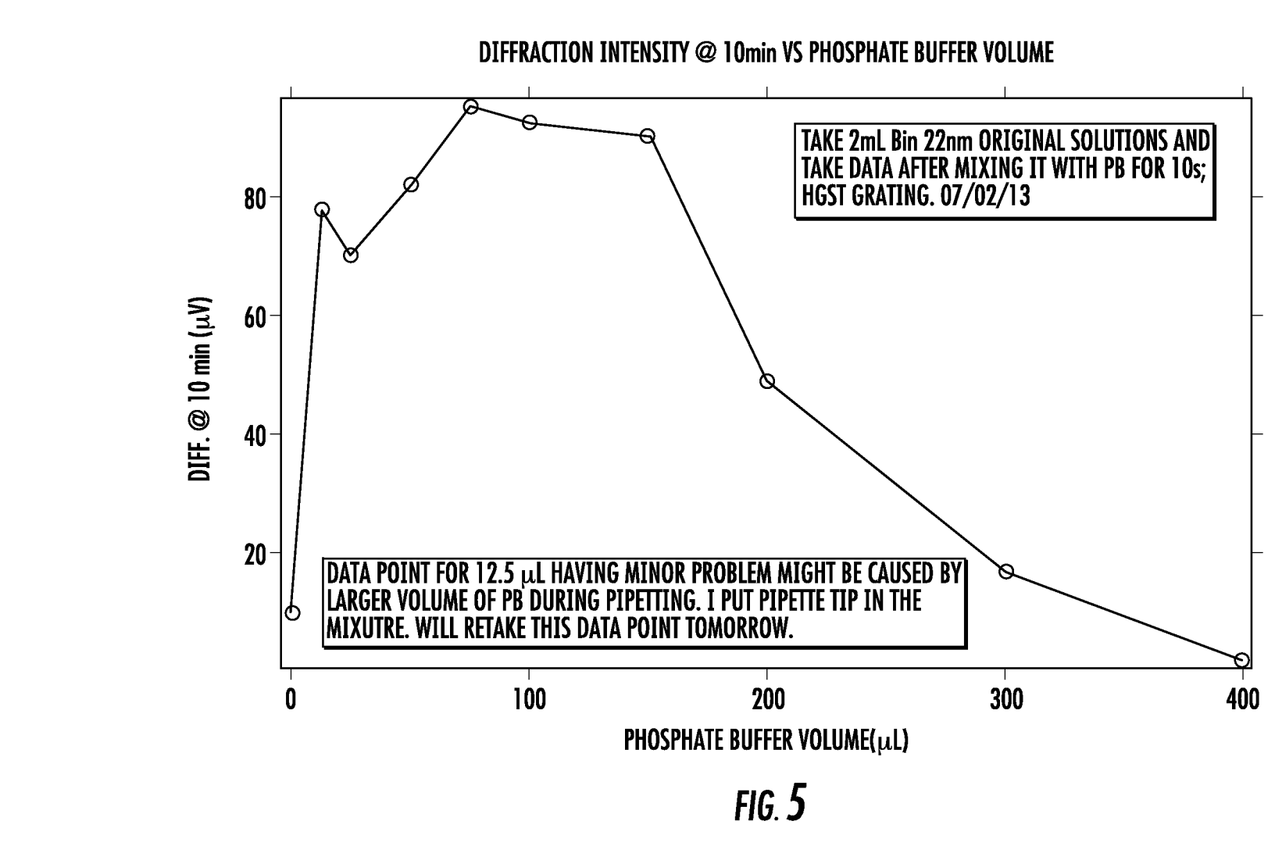
FIG. 5 shows a plot of the diffraction intensity as measured according to the Examples.
Figure 6:
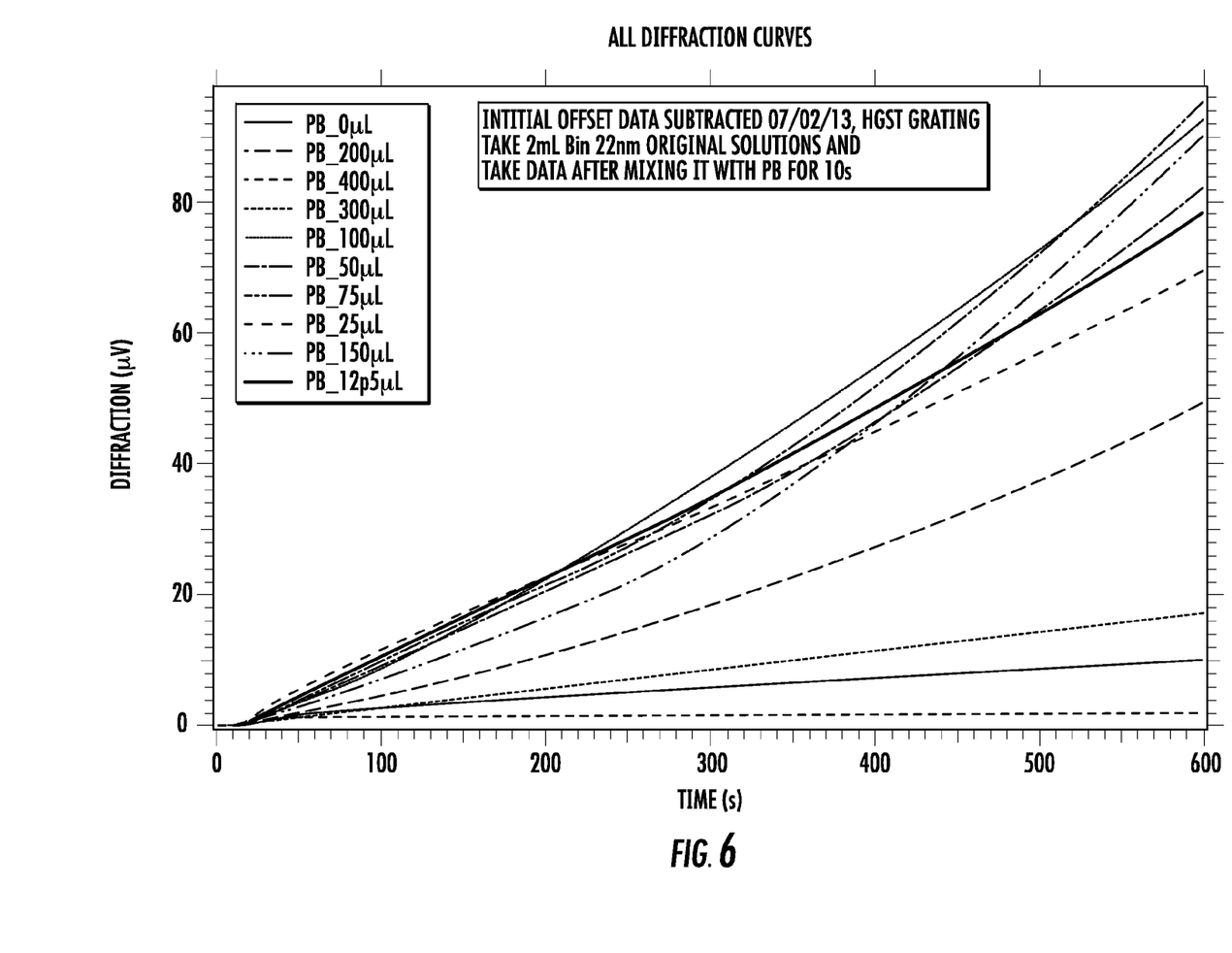
FIG. 6 shows a plot of the diffraction curves as measured according to the Examples.
Figure 7:
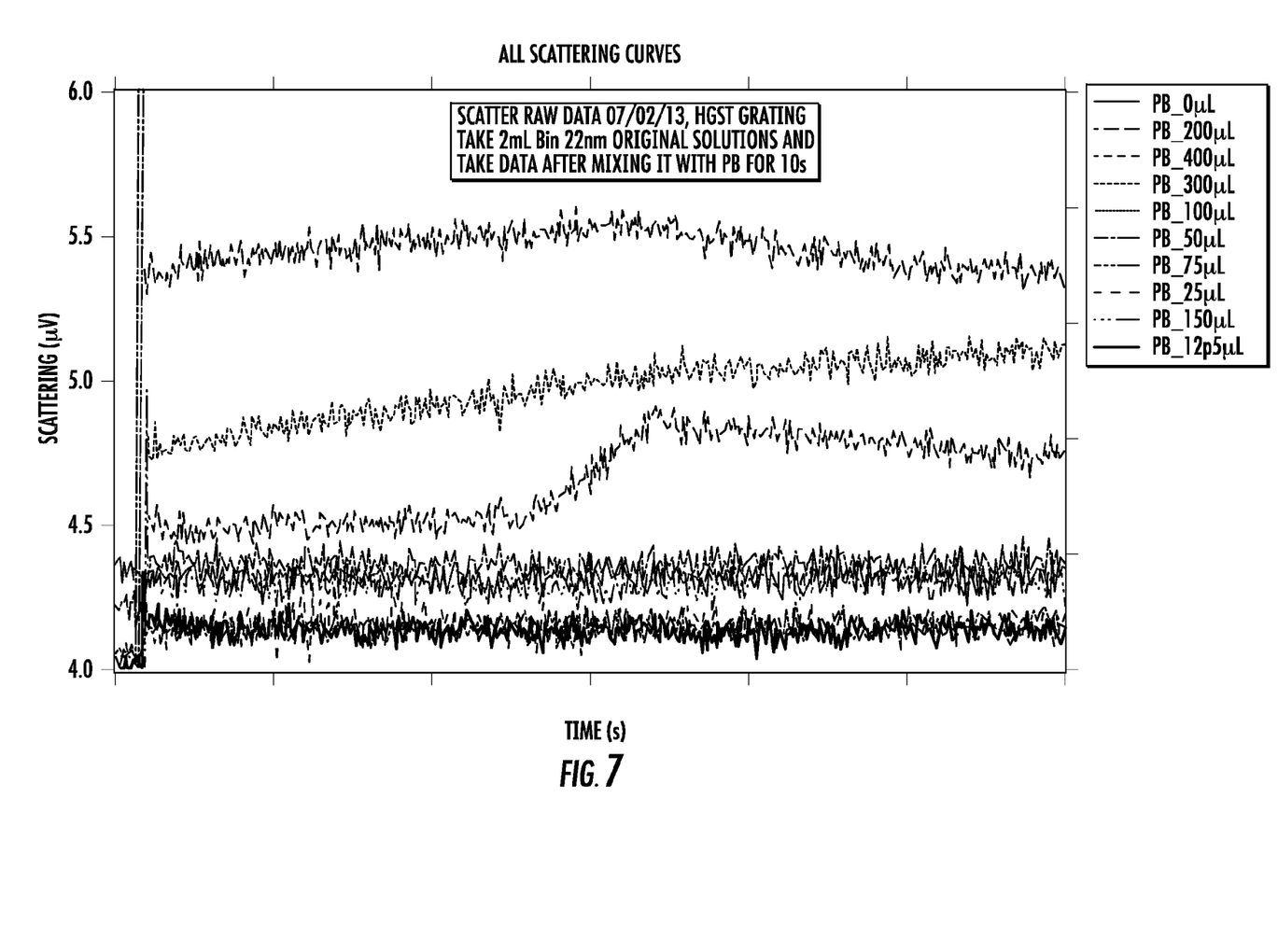
FIG. 7 shows a plot of the scattering curves as measured according to the Examples.

20 µL of concentrated ferrofluid (Ferrotec, Nashua, N.H., EMG-707: 13 nm particle diameter, 2% volume concentration) was added to 40 mL of deionized water (pH of 7.0). Then, various amounts of a phosphate buffer saline (Aqua Solutions Inc, Deer Park, Tex., BDH. pH of 7.2, $NH_4Cl$: 0.1-0.2%, $K_2HPO_4$: 2-3%, $KH_2PO_4$: 0.5-1%, $Na_2HPO_4$: 1.5-2%) was added in an amount of 10 μL up to 400 μL to 2 mL of the diluted particle suspension. The diffraction intensity was measured and shown in FIG. 5; the diffraction curves were also measured (FIG. 6); and the scattering curves were also measured (FIG. 7).

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of forming a nanoparticle assembly, the method comprising:
    applying a colloidal fluid to a surface of a magnetic media, wherein the colloidal fluid comprises magnetic nanoparticles, a surfactant, a phosphate buffered saline solution comprising 0.1% to 0.2% $NH_4Cl$, 2% to 3% $K_2HPO_4$, 0.5% to 1% $KH_2PO_4$, and 1.5% to 2% $Na_2HPO_4$, and a carrier medium, the phosphate buffered saline solution being present in the colloidal fluid in an amount of about 10 μL to about 400 μL per 2 mL of the colloidal fluid;
    upon the application, the magnetic nanoparticles assembling into a pattern through a magnetic force arising from the surface of the magnetic media; and
    following application of the colloidal fluid to the surface of the magnetic media, adding a buffer solution to the colloidal fluid that is on the surface of the magnetic media.

2. The method as in claim 1, wherein the phosphate buffered saline solution has a pH of about 7 to about 8.

3. The method as in claim 1, wherein the phosphate buffered saline solution has a pH of about 7 to about 7.5.

4. The method as in claim 1, wherein the phosphate buffered saline solution is present in the colloidal fluid in an amount of about 0.5% to about 10% by volume.

5. The method as in claim 1, wherein the phosphate buffered saline solution is present in the colloidal fluid in an amount of about 2% to about 8% by volume.

6. The method as in claim 1, wherein the magnetic nanoparticles are coated with the surfactant.

7. The method as in claim 6, wherein the surfactant has a polar head and non-polar tail, and wherein one of the polar head or non-polar tail adsorbs into the magnetic nanoparticles while the other extends into the carrier medium to form inverse or regular micelles around the magnetic nanoparticles such that steric repulsion prevents agglomeration of the magnetic nanoparticles.

8. The method as in claim 1, wherein the surfactant is selected from the group consisting of oleic acid, tetramethylammonium hydroxide, citric acid, soy lecithin, and a mixture thereof.

9. The method as in claim 1, wherein the magnetic nanoparticles comprise iron.

10. The method as in claim 1, wherein the magnetic nanoparticles are selected from the group consisting of magnetite, hematite, an iron-containing compound other than magnetite and hematite, and mixtures thereof.

11. The method as in claim 1, wherein the magnetic nanoparticles have an average size of about 100 nanometers or less.

12. The method as in claim 1, wherein the magnetic nanoparticles have an average size of about 5 nanometers to about 25 nanometers.

13. The method as in claim 1, wherein the buffer solution comprises a salt solution.

14. The method as in claim 1, wherein the buffer solution comprises a second phosphate buffered saline solution.

15. The method as in claim 1, wherein the buffer solution has a pH of about 7 to about 8.

16. The method as in claim 1, wherein the buffer solution comprises a positive ion-containing salt solution.

17. The method as in claim 16, wherein the buffer solution pacifies a negative charge on the magnetic nanoparticles such that a repulsive electrostatic force is reduced compared with the magnetic force.

18. The method as in claim 1, further comprising:
    adding a soap solution to the surface of the magnetic media after adding the buffer solution to the colloidal fluid.

19. The method as in claim 18, wherein the soap solution comprises water and a second surfactant.

20. The method as in claim 19, wherein the water is deionized water.

21. The method as in claim 18, further comprising:
    washing the surface of the magnetic media with deionized water after adding the soap solution.

* * * * *